(12) United States Patent
Christensen et al.

(10) Patent No.: US 9,300,367 B2
(45) Date of Patent: Mar. 29, 2016

(54) RECEIVER AND METHOD FOR RETRIEVING AN INFORMATION SIGNAL FROM A MAGNETIC INDUCTION SIGNAL

(75) Inventors: Kåre Tais Christensen, Smørum (DK); Rasmus Glarborg Jensen, Smørum (DK)

(73) Assignee: OTICON A/S, Smorum (DK)

( * ) Notice: Subject to any disclaimer, the term of this patent is extended or adjusted under 35 U.S.C. 154(b) by 787 days.

(21) Appl. No.: 13/464,428

(22) Filed: May 4, 2012

(65) Prior Publication Data
US 2012/0281843 A1 Nov. 8, 2012

Related U.S. Application Data

(60) Provisional application No. 61/483,075, filed on May 6, 2011.

(30) Foreign Application Priority Data

May 6, 2011 (EP) .................................... 11165050

(51) Int. Cl.
  *H04R 25/00* (2006.01)
  *H04B 5/00* (2006.01)
  *H01Q 1/27* (2006.01)
  *H01Q 7/00* (2006.01)
(52) U.S. Cl.
  CPC ............. *H04B 5/0075* (2013.01); *H01Q 1/273* (2013.01); *H01Q 7/005* (2013.01); *H04B 5/0006* (2013.01); *H04R 25/554* (2013.01); *H04R 25/558* (2013.01); *H04R 2225/51* (2013.01); *H04R 2460/03* (2013.01)
(58) Field of Classification Search
  USPC .................... 381/111, 113–114, 315; 327/536
  See application file for complete search history.

(56) References Cited

U.S. PATENT DOCUMENTS

| 7,239,713 | B2 | 7/2007 | Niederdrank |
| 7,605,757 | B1 | 10/2009 | Gribble et al. |
| 7,953,184 | B2 | 5/2011 | Lee et al. |

(Continued)

FOREIGN PATENT DOCUMENTS

| EP | 1 448 021 A2 | 8/2004 |
| EP | 1 557 958 A1 | 7/2005 |

(Continued)

OTHER PUBLICATIONS

Andersson "Multiband LNA Design and RF-Sampling Front-ends for Flexible Wireless Receivers", Linkopings Universitet, pp. 1-95 (2006).
Deiss et al. "A 200 MHz Sub-mA RF Front End for Wireless Hearing Aid Applications" IEEE Journal of Solid-State Circuits, pp. 274-277 (2002).

(Continued)

*Primary Examiner* — Davetta W Goins
*Assistant Examiner* — Amir Etesam
(74) *Attorney, Agent, or Firm* — Birch, Stewart, Kolasch & Birch, LLP

(57) ABSTRACT

A receiving antenna circuit is arranged in a reactive near-field of a modulated magnetic induction signal and forms a narrow band-pass filter. The output of the antenna circuit is not subjected to any frequency translation prior to digitizing, and the signal may nevertheless be digitized with low resolution, which radically reduces the power consumption of the receiving circuits. The reduction in power consumption is of several orders of magnitude, which allows implementation of such receiving circuits in battery-driven devices such as hearing devices without substantially affecting the battery life.

15 Claims, 3 Drawing Sheets

(56) References Cited

U.S. PATENT DOCUMENTS

| | | | |
|---|---|---|---|
| 8,452,233 B2 | 5/2013 | Noel | |
| 8,750,539 B2 * | 6/2014 | Pennock et al. | 381/122 |
| 2005/0219132 A1 * | 10/2005 | Charrat | H01Q 1/22 343/745 |
| 2007/0053466 A1 * | 3/2007 | Klostermann | H04L 27/2331 375/316 |
| 2007/0096801 A1 * | 5/2007 | Shimizu | 330/10 |
| 2007/0140382 A1 | 6/2007 | Qian | |
| 2008/0158076 A1 | 7/2008 | Walley | |
| 2011/0096874 A1 | 4/2011 | Walsh et al. | |
| 2012/0300552 A1 * | 11/2012 | Neto et al. | 365/185.18 |

FOREIGN PATENT DOCUMENTS

| | | |
|---|---|---|
| EP | 1 944 873 A2 | 7/2008 |
| EP | 1 966 852 B1 | 9/2010 |
| JP | 2006-140809 A | 6/2006 |
| WO | WO 02/30154 A1 | 4/2002 |

OTHER PUBLICATIONS

Mavric "Digitizer Provides Direct Sampling of RF Signals", Microwaves & RF, pp. 62, 64, 66, 68 and 70-71 (2006).

Yuce "A Differential-Based Multiple Bit Rate PSK Receiver: Theory, Architecture, and SOI CMOS Implementation" Electrical and Computer Engineering, pp. 1-127 (2004).

* cited by examiner

RECEIVER AND METHOD FOR RETRIEVING AN INFORMATION SIGNAL FROM A MAGNETIC INDUCTION SIGNAL

CROSS REFERENCE TO RELATED APPLICATIONS

This nonprovisional application claims the benefit of U.S. Provisional Application No. 61/483,075 filed on May 6, 2011 and to patent application Ser. No. 11/165,050.3 filed in Europe, on May 6, 2011. The entire contents of all of the above applications is hereby incorporated by reference.

TECHNICAL FIELD

The present invention relates to a receiver and a method for retrieving an information signal from a magnetic induction signal, and to a use of such a receiver.

The invention may e.g. be useful in wireless communication between body-worn devices, such as hearing devices and auxiliary devices. Hearing devices may include hearing aids for compensating for a hearing-impaired person's loss of hearing capability or listening devices for augmenting a normal-hearing person's hearing capability.

BACKGROUND ART

WO2002/030154A1 discloses a hearing aid comprising a radio-frequency (RF) receiver in which an analog frequency-modulated RF signal in the range from 70 MHz to 250 MHz is picked up by an antenna and amplified in a low-noise amplifier. A mixer mixes the signal down to an intermediate frequency (IF) of 35 kHz. A steep IF filter suppresses undesired signals in adjacent channels. A limiter boosts the IF signal and transforms the analog signal to digital signal levels using a hard-clipping comparator. A digital demodulator detects the zero-crossings of the IF signal, and a decimator transforms the single-bit demodulated signal into a 12-bit signal at a sampling frequency of 24 kHz. The 12-bit signal forms a digital audio output of the receiver.

EP1316240B1 discloses a binaural hearing system with two hearing prostheses capable of performing bi-directional data communication over a wireless communication channel. Wireless transceivers transmit and receive modulated data signals by utilising near-field magnetic coupling between inductive coils. The coils may be tuned to provide a Q for each of the inductive antennas of about 4, preferably between 3 and 10 to optimise the received/transmitted power at the antennas. The communication frequency is preferably selected to a frequency between 50 MHz-100 MHz. An RF demodulator down-converts the received composite RF signal to a baseband frequency range and retrieves the modulated data signal.

These are just two examples of many known RF receivers, which mix a modulated RF signal to a lower frequency, i.e. perform a downward frequency translation, prior to digitising or sampling. This frequency translation makes channel filtering and digitising less critical and allows a substantial reduction of the power consumption. However, the circuits used for mixing the modulated RF signal and for filtering the signal at the lower frequency are mainly analog and thus often deviate from desired specifications due to relatively large component tolerances and temperature drift of the component values. This may lead to a deterioration of the received signal and may thus decrease the obtainable communication speed where the received signal comprises digital information. Furthermore, the analog mixing and filtering circuits are often relatively complex and typically consume a substantial amount of power. It is further not trivial to design analog circuits in which the mixing frequency and/or the filter bandwidth may be changed electronically, which adds to complexity and/or restricts the use of prior art receivers.

It is therefore desirable to perform conversion into a digital signal directly on the modulated RF signal and use digital filters for removing unwanted signal frequencies, followed by digital demodulation. Such "direct sampling" would allow more stable processing of the RF signal, allow a simpler receiver design and further allow changing the characteristics of the wireless connection by reprogramming, so that one and the same circuit could be used in a wider range of applications.

Direct sampling of modulated RF signals has, however, been almost impossible to realise in practice. Normally, the sampling rate in the analog-to-digital conversion must be at least twice the RF signal frequency in order to avoid frequency aliasing, and the digitiser—or analog-to-digital converter (ADC)—needs a high resolution in order to allow retrieval of weak signals in the presence of strong unwanted signals. With the technology available today, these two requirements typically combine to cause unacceptably large power consumption in the digital conversion and filtering circuits. In a typical setup, reducing the power consumption to an acceptable level would therefore require compromising the signal quality to an unacceptable degree.

It is an object of the present invention to provide a receiver for retrieving an information signal from a magnetic induction signal comprising a carrier signal modulated in dependence on the information signal, which receiver is capable of direct sampling of the magnetic induction signal without the above mentioned disadvantages.

It is a further object to provide a use of such a receiver.

It is a further object to provide a method for retrieving an information signal from a magnetic induction signal comprising a carrier signal modulated in dependence on the information signal, which method comprises direct sampling of the magnetic induction signal without the above mentioned disadvantages.

DISCLOSURE OF INVENTION

These and other objects of the invention are achieved by the invention defined in the independent claims and as explained in the following description. Further objects of the invention are achieved by the embodiments defined in the dependent claims and in the detailed description of the invention.

The inventors of the present invention have discovered that, quite unexpectedly, direct sampling may be utilised in communication by means of modulated near-field magnetic induction (NFMI) signals without the above mentioned disadvantages, provided that the antenna circuit receiving the modulated NFMI signal is arranged within the reactive near-field thereof. Furthermore, it is advantageous that the antenna circuit is designed as a band-pass filter that is narrow enough to be used to suppress signals outside the communication channel, i.e. the antenna circuit is adapted to function as a channel-selection filter. As explained in the following, this allows for the omission of further substantive filtering of the received signal prior to digitising and for digitising the signal with low resolution, which radically reduces the power consumption of the receiving circuits. The achievable reduction in power consumption is surprisingly of several orders of magnitude and thus allows implementation of such receiving circuits in battery-driven devices such as hearing devices without substantially affecting the battery life.

Communication by means of modulated NFMI signals normally takes place within the reactive near-field of an electrically small antenna. An electrically small antenna is defined as an antenna with a largest physical extension considerably smaller than the wavelength. The reactive near-field is defined as the physical space surrounding the antenna in which there is a significant reactive coupling between the antenna and the field. As a rule of thumb, the reactive near-field extends from the antenna and out to a distance of about one sixth of the wavelength. In the reactive near-field, the signal energy decreases inversely proportional to the sixth power of the distance (60 dB per decade). The far-field extends outwards from about two wavelengths from the antenna. In the far-field, there is no reactive coupling and the energy is radiated into the surrounding space. In the far-field, the signal energy decreases inversely proportional to the second power of the distance (20 dB per decade).

Within the reactive near-field, the reactive coupling thus causes signal levels to be considerably higher than those predicted by the above mentioned law for the far-field. Communicating within the reactive near-field thus inherently causes a relatively strong discrimination of the communication signals over magnetic signals radiated by disturbing sources in the far-field. This effect in conjunction with the use of the antenna circuit as a narrow band-pass filter allows the communication signals to be predominantly represented in the electric signal provided by the antenna circuit. Disturbing signals from distant sources are inherently suppressed, so that a digitiser with a relatively small dynamic range may be used to digitise the communication signals. Thus, direct sampling of the received signal may be achieved without unacceptably high power consumption and without compromising the quality of the communication signals.

In the present context, a "hearing device" refers to a device, such as e.g. a hearing aid or an active ear-protection device, which is adapted to improve or augment the hearing capability of an individual by receiving acoustic signals from the individual's surroundings, modifying the acoustic signals electronically and providing audible signals to at least one of the individual's ears. Such audible signals may e.g. be provided in the form of acoustic signals radiated into the individual's outer ears, acoustic signals transferred as mechanical vibrations to the individual's inner ears via the bone structure of the individual's head and/or electric signals transferred directly or indirectly to the cochlear nerve of the individual. The hearing device may be configured to be worn in any known way, e.g. as a unit arranged behind the ear with a tube leading radiated acoustic signals into the ear canal or with a speaker arranged close to or in the ear canal, as a unit entirely or partly arranged in the pinna and/or in the ear canal, as a unit attached to a fixture implanted into the skull bone, etc. More generally, a hearing device comprises an input transducer for receiving an acoustic signal from an individual's surroundings and providing a corresponding electric input signal, a signal processing circuit for processing the electric input signal and an output transducer for providing an audible signal to the individual in dependence on the processed signal.

A "hearing system" refers to a system comprising one or two hearing devices, and a "binaural hearing system" refers to a system comprising one or two hearing devices and being adapted to provide audible signals to both of the individual's ears. Hearing systems or binaural hearing systems may further comprise "auxiliary devices", which communicate with the hearing devices and affect and/or benefit from the function of the hearing devices. Auxiliary devices may be e.g. remote controls, audio gateway devices, mobile phones, public-address systems, car audio systems or music players. Hearing devices, hearing systems or binaural hearing systems may e.g. be used for compensating for a hearing-impaired person's loss of hearing capability or augmenting a normal-hearing person's hearing capability.

As used herein, the singular forms "a", "an", and "the" are intended to include the plural forms as well (i.e. to have the meaning "at least one"), unless expressly stated otherwise. It will be further understood that the terms "has", "includes", "comprises", "having", "including" and/or "comprising", when used in this specification, specify the presence of stated features, integers, steps, operations, elements and/or components, but do not preclude the presence or addition of one or more other features, integers, steps, operations, elements, components and/or groups thereof. It will be understood that when an element is referred to as being "connected" or "coupled" to another element, it can be directly connected or coupled to the other element, or intervening elements may be present, unless expressly stated otherwise. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF THE DRAWINGS

The invention will be explained in more detail below in connection with preferred embodiments and with reference to the drawings in which.

The figures are schematic and simplified for clarity, and they just show details, which are essential to the understanding of the invention, while other details are left out. Throughout, like reference numerals and/or names are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
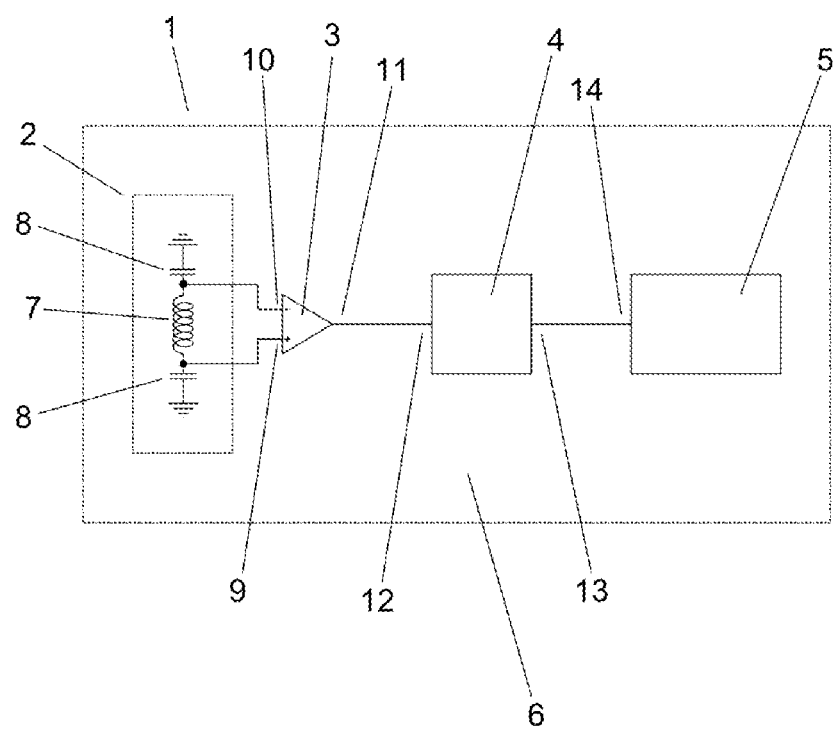
FIG. 1 shows an embodiment of a receiver according to the invention.

The receiver 1 shown in FIG. 1 comprises an antenna circuit 2, a low-noise amplifier 3, a comparator 4 and a digital demodulator 5 connected to form a signal path 6. The antenna circuit 2 comprises an antenna coil 7 with two terminals and two tank capacitors 8. One terminal of each tank capacitor 8 is connected to a respective terminal of the antenna coil 7, and the respective other terminals of the tank capacitors 8 are connected to a ground-plane of the receiver 1. The terminals of the antenna coil 7 are further connected respectively to a positive input terminal 9 and a negative input terminal 10 of the low-noise amplifier 3. An output terminal 11 of the low-noise amplifier 3 is connected to an input terminal 12 of the comparator 4. An output terminal 13 of the comparator 4 is connected to an input terminal 14 of the digital demodulator 5.

The antenna coil 7 and the tank capacitors 8 form a passive, narrow band-pass filter with a centre frequency of 4 MHz and a 3-dB bandwidth of 200 kHz for received magnetic induction signals. The narrow band-pass filter formed by the antenna circuit 2 thus has a relative 3-dB bandwidth of 5%, corresponding to a quality factor (Q) of 20. When receiving a magnetic induction signal, the antenna coil 7 provides a corresponding electric antenna signal across its terminals. The antenna coil 7 may comprise a core made of a material with high magnetic permeability and preferably a low electrical conductivity (not shown), e.g. a ferrite core, to increase the sensitivity of the antenna circuit 2. The topology of the antenna circuit 2 may differ substantially from the embodiment shown in FIG. 1 without departing from the invention, provided that the antenna circuit 2 forms a narrow band-pass filter in the signal path 6. For instance, further capacitors may be added, e.g. in order to provide DC blocking and/or impedance transformation.

The low-noise amplifier 3 amplifies the relatively weak electric antenna signal, e.g. by 60 dB, and provides a corresponding amplified signal on its output terminal 11. The portion of the signal path 6 extending between the terminals of the antenna circuit 2 and the input terminal 12 of the comparator 4, which portion comprises the low-noise amplifier 3, does not perform any frequency translation, nor any substantial frequency filtering of the electric antenna signal. In the present context, "substantial frequency filtering" is meant to be any filtering that would substantially change the 3-dB bandwidth of the amplified signal supplied to the input terminal 12 of the comparator 4 when the antenna circuit 2 is subjected to a white-noise magnetic induction signal having a 3-dB frequency range substantially exceeding the pass-band of the antenna circuit 2. In other words, a substantial frequency filtering would be any frequency filtering comparable to the frequency filtering of the antenna circuit 2 and thus having a substantial impact on the transfer function of the receiver 1 within and in the vicinity of the 3-dB pass-band of the antenna circuit 2.

As an example, a band-pass filter (not shown) with a relative 3-dB bandwidth of e.g. 25% (Q=4), i.e. with a 3-dB bandwidth equal to five times that of the antenna circuit 2, and a centre frequency equal to the centre frequency of the antenna circuit 2 could be inserted in the signal path 6 between the low-noise amplifier 3 and the comparator 4 in order to suppress noise generated in the low-noise amplifier 3. Such a noise filter would not substantially modify the transfer function of the receiver 1 within and in the vicinity of the 3-dB pass-band of the antenna circuit 2 and would thus—in the present context—not be considered to cause a substantial frequency filtering. Such a noise filter may alternatively be part of the low-noise amplifier 3. As a general rule, the bandwidth of a noise filter in the input path 6 between the antenna circuit 2 and the digitiser 4 should be substantially larger than the bandwidth of the antenna circuit 2 to avoid substantial frequency filtering.

The comparator 4 functions as a digitiser and digitises the amplified signal by outputting a logic "1" when the amplified signal voltage is above zero and a logic "0" when the amplified signal voltage is below zero (or vice versa). The comparator 4 thus also functions as a zero-crossing detector, and the digitised signal provided by the comparator 4 comprises information about the phase and the frequency of the amplified signal. The digital demodulator 5 receives the digitised signal on its input terminal 14 and demodulates it in order to retrieve information from the phase and/or frequency of the amplified signal.

The comparator 4 has a sampling frequency of 40 MHz, i.e. ten times the centre frequency of the antenna circuit 2. This oversampling increases the temporal resolution of the digitising and allows sophisticated filtering of the digitised signal in the subsequent processing stages, e.g. in order to improve immunity to noise etc. The sampling frequency is preferably about 2.5, about 5 or about 10 times the highest frequency present in the magnetic induction signal.

Before use of the receiver 1, the antenna circuit 2 is arranged within the reactive near-field of a magnetic induction signal transmitted by a transmitter (not shown). The magnetic induction signal comprises a carrier signal modulated in dependence on an information signal. The carrier signal is a single-frequency signal at the centre frequency of the antenna circuit 2. The information signal may comprise any combination of digital and analog information.

Due to the phase and/or frequency modulation of the carrier signal, the information signal is present in the phase and/or frequency of the amplified signal, and the digital demodulator 5 may thus retrieve the information signal by demodulating the digitised signal present on its input terminal 14. Prior to demodulation, the digitised signal may be subjected to filtering and/or frequency translation (mixing), e.g. in order to compensate for a frequency dependency of the antenna circuit 2 and/or to reduce the power consumption in the digital demodulator 5.

The antenna circuit 2 may preferably be tuned to form a narrow band-pass filter with a relative bandwidth less than 10% (Q≥10), less than 5% (Q≥20), less than 3% (Q≥~33) or less than 2% (Q≥50), depending on the carrier frequency, the bandwidth of the information signal, the desired communication range, the acceptable bit error rate as well as other requirements for the communication link. A narrower filter removes more disturbing noise signals, but on the other hand reduces the usable bandwidth of the information signal.

The antenna circuit 2 may preferably be tuned to form a narrow band-pass filter with a centre frequency below 100 MHz, below 30 MHz or below 10 MHz, depending primarily on the carrier frequency. A lowering of the frequency generally causes lower power consumption. The antenna circuit 2 should, however, preferably be tuned to form a narrow band-pass filter with a centre frequency above 300 kHz, above 1 MHz or above 3 MHz in order to achieve a high data rate (bits per second) in the communication link. Preferred data rates are above 20 kb/s, above 40 kb/s or above 80 kb/s in order to allow reception of real-time audio signals via the receiver 1.

The antenna circuit 2 may preferably be dimensioned to have a largest physical extension of less than 5 cm, less than 2 cm or less than 1 cm. Smaller dimensions allow implementation in smaller devices. Furthermore, smaller dimensions generally simplify achieving a smaller bandwidth.

The antenna circuit 2 may preferably comprise an antenna coil 7 and one or more tank capacitors 8. The tank capacitors 8 may be used to tune the antenna circuit 2 to a desired centre frequency.

The antenna circuit 2 may preferably further comprise one or more resistors (not shown). The resistors may be used to increase the bandwidth of the antenna circuit 2.

The receiver 1 may preferably comprise one or more switching means (not shown) operable to switch different sets of tank capacitors 8 and/or resistors to the antenna coil 7. This allows the antenna circuit 2 to be electronically and thus programmatically tuned to specific centre frequencies and/or bandwidths and thus allows a versatile use of the receiver. Since both the generation of the carrier signal, the modulation of the carrier signal and the demodulation of the received signal may be implemented in digital circuits, the carrier frequency, the modulation type, the signal bandwidth etc. may be changed freely by means of software or firmware. This gives a hitherto unknown freedom in the use of the receiver 1, which may e.g. be configured to receive signals from different kinds of systems simultaneously or time multiplexed.

The digitiser 4 may preferably be adapted to provide a digitised signal with a resolution of 4 bits, 3 bits, 2 bits or one bit. A lower bit count generally reduces the power consumption of the receiver 1, however at the cost of dynamic range.

The receiver 1 may preferably be dimensioned to having a power consumption less than 10 mW, less than 3 mW or less than 1 mW. This allows use of the receiver 1 in battery-powered devices, such as body-worn hearing devices.

The information signal may be modulated onto the carrier signal by means of e.g. phase modulation, frequency modulation, phase-shift keying and/or frequency-shift keying. Such modulation forms allow the use of a single-bit digitiser 4 and thus reduces the power consumption of the receiver 1. These modulation forms further allow both analog and digital information signals to be modulated onto the carrier signal. Especially preferred modulation techniques comprise minimum shift keying and other of the various known modulation techniques that allow using a relative small signal bandwidth and thus allow the modulated signal to pass the antenna circuit 2 without substantial deterioration.

Figure 2:
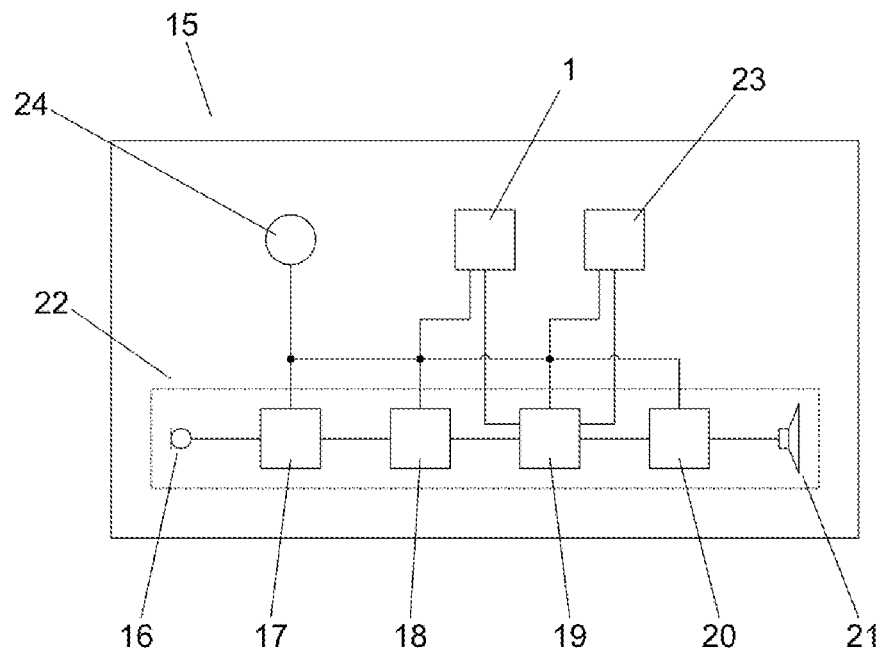
FIG. 2 shows an embodiment of a hearing device according to the invention.

FIG. 2 shows a hearing device 15, e.g. a hearing aid or an active ear-protection device, comprising a receiver 1 as described above. The hearing device 15 further comprises a microphone 16, a preamplifier 17, an audio digitiser 18, an audio signal processor 19, a pulse-width modulator 20 and a speaker 21 connected to form an audio signal path 22. The hearing device 15 further comprises a transmitter 23 for transmitting a magnetic induction signal and a battery 24 for powering the devices 17, 18, 19, 20 in the audio signal path 22, the receiver 1 and the transmitter 23. The microphone 16 is arranged to receive an acoustic input signal from an individual's surroundings and provide a corresponding microphone signal to the preamplifier 17. The preamplifier 17 is adapted to amplify the microphone signal and provide the amplified microphone signal to the audio digitiser 18. The audio digitiser 18 is adapted to digitise the amplified microphone signal and provide a digitised audio signal to the audio signal processor 19, which is adapted to modify the digitised audio signal in accordance with the purpose of the hearing device 15, i.e. to improve or augment the hearing capability of the individual. The audio signal processor 19 is adapted to provide the modified audio signal to the pulse-width modulator 20, which is adapted to provide a corresponding pulse-width modulated signal to the speaker 21. The hearing device 15 is adapted to be arranged at or in an ear of the individual, and the speaker 21 is arranged to transmit an acoustic output signal corresponding to the pulse-width modulated signal to the individual.

The audio signal processor 19 is connected to the receiver 1 and is adapted to receive the retrieved information signal from the receiver 1 and to adjust its modification of the digitised audio signal in response to information comprised in the information signal and/or to provide the modified audio signal in dependence on an audio signal comprised in the information signal. This allows the hearing device 15 to change its audio signal processing in response to e.g. commands, status information and/or audio signals received wirelessly in a magnetic induction signal from a remote device (not shown) and/or to include such audio signals in the acoustic signal transmitted by the speaker 21. The remote device could be a second hearing device (see FIG. 3, 28) located at or in the respective other ear of the individual or an auxiliary device, e.g. a so-called streamer (see FIG. 3, 30), adapted to transmit an audio signal from an external device, such as e.g. a mobile phone or a TV set, to the hearing device 15. Such audio signals may e.g. be received from the external device by means of a wired connection or by means of a wireless connection with longer range than the magnetic induction signal, e.g. an FM connection or a Bluetooth connection.

The audio signal processor 19 is further connected to the transmitter 23 and is adapted to provide an information signal comprising information such as commands, status information and/or a microphone signal to the transmitter 23 for transmission to a remote device. The transmitter 23 is adapted to modulate a carrier signal in dependence on the information signal and to transmit the modulated carrier signal in a magnetic induction signal. The transmitter 23 may comprise a transmit antenna (not shown) for radiating the magnetic induction signal, or it may be connected to radiate the signal via the antenna circuit 2 of the receiver 1. In the latter case, the hearing device 15 may further comprise a switching circuit (not shown) for switching the antenna circuit 2 between reception and transmission modes. The transmitter 23 and the transmit antenna or the switching circuit may be omitted in the case that the hearing device 15 is not intended to transmit a magnetic induction signal. The receiver 1, the transmitter 23 and the switching circuit may alternatively be combined to form a transceiver unit, which could also be used in other types of devices than hearing devices.

Figure 3:
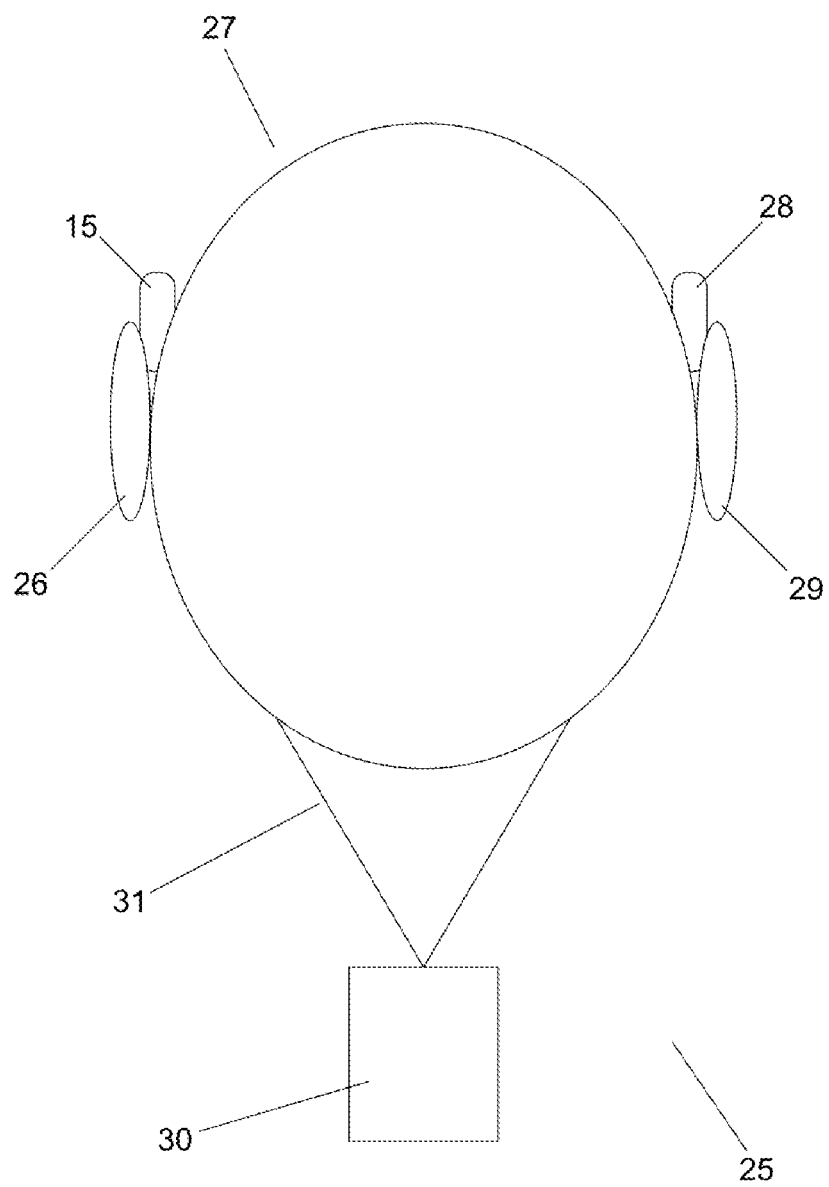
FIG. 3 shows an embodiment of a binaural hearing system according to the invention.

The binaural hearing system 25 shown in FIG. 3 comprises a first hearing device 15 as described above arranged at a first ear 26 of an individual 27, a similar second hearing device 28 arranged at the other ear 29 and a streamer 30 worn as a pendant attached to a neck loop 31 arranged around the neck of the individual 27. The two hearing devices 15, 28 and the streamer 30 each comprise a transmitter 23 for a magnetic induction signal. The frequency of the carrier signal is chosen such that the antenna circuits 2 of the hearing devices 15, 28 are within the reactive near-field of each of the magnetic induction signals transmitted by the respective other devices 15, 28, 30 of the binaural hearing system 25 when the hearing devices 15, 28 are arranged at or in the ears 26, 28 and the streamer 30 is worn as shown. The maximum distance $d_{max}$ between any two of the devices 15, 28, 30 should thus not exceed about one sixth of the wavelength. If $d_{max}$ is e.g. 0.5 m, the carrier frequency should not exceed $f_{max}=\frac{1}{6} \times c/d_{max}$, i.e. about 110 MHz, in order to satisfy this condition (c is the speed of sound, i.e. ~340 m/s). The devices 15, 28, 30 of the binaural hearing system 25 are thus able to communicate wirelessly with each other as described further above. The streamer 30 or any other auxiliary device, such as e.g. a remote control, may alternatively be worn at other locations on the body, in which case a lower carrier frequency may be required to make the binaural hearing system 25 satisfy the near-field condition.

The binaural hearing system 25 is preferably dimensioned to allow wireless communication over a distance of more than 15 cm, more that 30 cm or more than 50 cm, depending on the intended relative positions of the devices 25, 28, 30. Accordingly, the receiver 1 is preferably dimensioned to retrieve the information signal from a modulated NFMI signal originating from a transmitter located at a distance of more than 15 cm, more that 30 cm or more than 50 cm from the antenna circuit 2. Furthermore, the binaural hearing system 25 is preferably dimensioned to allow wireless communication partly through the body and/or the head of the individual 27.

The audio path 22 is preferably implemented mainly as digital circuits operating in the discrete time domain, but any or all parts hereof may alternatively be implemented as analog circuits operating in the continuous time domain. Digital functional blocks of the audio signal processor 19 and/or of the receiver 1 may be implemented in any suitable combination of hardware, firmware and software and/or in any suitable combination of hardware units. Furthermore, any single hardware unit may execute the operations of several functional blocks in parallel or in interleaved sequence and/or in any suitable combination thereof.

Further modifications obvious to the skilled person may be made to the disclosed method, system and/or device without deviating from the spirit and scope of the invention. Within this description, any such modifications are mentioned in a non-limiting way.

Some preferred embodiments have been described in the foregoing, but it should be stressed that the invention is not limited to these, but may be embodied in other ways within the subject-matter defined in the following claims. For example, the features of the described embodiments may be combined arbitrarily, e.g. in order to adapt the system, the devices and/or the method according to the invention to specific requirements.

It is further intended that the structural features of the system and/or devices described above, in the detailed description of 'mode(s) for carrying out the invention' and in the claims can be combined with the methods, when appropriately substituted by a corresponding process. Embodiments of the methods have the same advantages as the corresponding systems and/or devices.

Any reference numerals and names in the claims are intended to be non-limiting for their scope.

The invention claimed is:

1. A receiver for retrieving an information signal in a reactive near-field of a transmitter of a magnetic induction signal by direct sampling the magnetic induction signal comprising a carrier signal modulated based on the information signal, the receiver having a signal path comprising:
    an antenna circuit configured to receive the magnetic induction signal and to provide a corresponding electric antenna signal;
    an amplifier adapted to amplify the electric antenna signal;
    a digitiser adapted to digitise the amplified signal; and
    a digital demodulator adapted to retrieve the information signal by demodulating the digitised signal, wherein
    the antenna circuit forms a narrow band-pass filter having a centre frequency at a frequency of the carrier signal and performs channel-selection filtering of the electric antenna signal, and
    the receiver is configured to retrieve the information signal from the electric antenna signal without any frequency mixing of the electric antenna signal to a lower frequency in the signal path between the antenna circuit and the digitiser.

2. A receiver according to claim 1, wherein the receiver is adapted to retrieve the information signal without any substantial frequency filtering in the signal path between the antenna circuit and the digitiser.

3. A receiver according to claim 1 or 2, wherein the relative 3-dB bandwidth of the antenna circuit is less than 10%, less than 5%, less than 3% or less than 2%.

4. A receiver according to claim 1, wherein the centre frequency of the antenna circuit is below 100 MHz, below 30 MHz or below 10 MHz and/or above 300 kHz, above 1 MHz or above 3 MHz.

5. A receiver according to claim 1, wherein the largest physical extension of the antenna circuit is less than 5 cm, less than 2 cm or less than 1 cm.

6. A receiver according to claim 1, wherein the antenna circuit comprises an antenna coil and one or more tank capacitors and/or one or more resistors.

7. A receiver according to claim 6, further comprising:
    one or more switches operable to connect different sets of tank capacitors and/or different sets of resistors to the antenna coil to electronically change the centre frequency and/or the bandwidth of the antenna circuit.

8. A receiver according to claim 1, wherein the digitiser is adapted to provide a digitised signal with a resolution of 4 bits, 3 bits, 2 bits or one bit.

9. A receiver according to claim 1, wherein the power consumption of the receiver is less than 10 mW, less than 3 mW or less than 1 mW.

10. A receiver according to claim 1, wherein the carrier signal is modulated by phase modulation, frequency modulation, phase-shift keying and/or frequency-shift keying.

11. A hearing device adapted to be arranged at or in an ear of an individual and comprising a receiver according to claim 1.

12. A binaural hearing system comprising a first hearing device according to claim 11 and a second hearing device adapted to be arranged at or in the respective other ear of the individual, the second hearing device comprising a transmitter for transmitting the magnetic induction signal such that the antenna circuit of the first hearing device is within the reactive near-field of the magnetic induction signal when both hearing devices are arranged at or in the respective ears.

13. A hearing system comprising a hearing device according to claim 11 and an auxiliary device adapted to be worn on the body of the individual, the auxiliary device comprising a transmitter for transmitting the magnetic induction signal such that the antenna circuit of the hearing device is within the reactive near-field of the magnetic induction signal when the hearing device is arranged at or in the ear and the auxiliary device is worn on the body.

14. Use of a receiver according to claim 1 for retrieving an information signal from a magnetic induction signal comprising a carrier signal modulated in dependence on the information signal wherein the antenna circuit is arranged within the reactive near-field of the magnetic induction signal.

15. A method for retrieving an information signal in a reactive near-field of a transmitter of a magnetic induction signal by direct sampling the magnetic induction signal comprising a carrier signal modulated based on the information signal, the method comprising:
    receiving the magnetic induction signal in an antenna circuit arranged in the reactive near-field of the magnetic induction signal and providing a corresponding electric antenna signal, the receiving including
        performing channel-selection filtering of the electric antenna signal by the antenna circuit with a centre frequency of said filtering being at a frequency of the carrier signal;
    amplifying the electric antenna signal;
    digitising the amplified signal; and
    retrieving the information signal by digital demodulation of the digitised signal, wherein
    said digitising takes as input the amplified electric antenna signal without any frequency mixing of the electric antenna signal to a lower frequency prior to said digitising.

* * * * *